United States Patent
Chen et al.

(10) Patent No.: US 11,917,468 B2
(45) Date of Patent: Feb. 27, 2024

(54) DETERMINING HANDOVER TARGET CELL AMONG NEIGHBOUR CELLS BASED ON MEASUREMENT REPORT AND CELL IDENTIFIER

(71) Applicant: NEC CORPORATION, Tokyo (JP)

(72) Inventors: Yuhua Chen, Tokyo (JP); Neeraj Gupta, Tokyo (JP); Jagdeep Ahluwalia Singh, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 526 days.

(21) Appl. No.: 16/960,478

(22) PCT Filed: Dec. 28, 2018

(86) PCT No.: PCT/JP2018/048597
§ 371 (c)(1),
(2) Date: Jul. 7, 2020

(87) PCT Pub. No.: WO2019/138950
PCT Pub. Date: Jul. 18, 2019

(65) Prior Publication Data
US 2020/0383016 A1 Dec. 3, 2020

(30) Foreign Application Priority Data
Jan. 12, 2018 (GB) ...................... 1800569

(51) Int. Cl.
*H04W 36/00* (2009.01)
*H04W 48/16* (2009.01)

(52) U.S. Cl.
CPC . *H04W 36/0085* (2018.08); *H04W 36/00835* (2018.08); *H04W 48/16* (2013.01)

(58) Field of Classification Search
CPC ......... H04W 36/0058; H04W 36/0083; H04W 36/00835; H04W 36/00837;
(Continued)

(56) References Cited

U.S. PATENT DOCUMENTS 9,294,963 B2 3/2016 Masini et al.
9,749,914 B2 * 8/2017 Chai ................. H04W 36/0085
(Continued)

FOREIGN PATENT DOCUMENTS

EP 2 352 332 A1 8/2011
JP 2016-021769 A 2/2016
(Continued)

OTHER PUBLICATIONS

Japanese Office Action for JP Application No. 2020-557532 dated Jul. 20, 2021 with English Translation.
(Continued)

*Primary Examiner* — Matthew W Genack
(74) *Attorney, Agent, or Firm* — Sughrue Mion, PLLC

(57) ABSTRACT

A communication system is disclosed which a base station configures a user equipment (UE) to carry out measurements of signals transmitted in a plurality of neighbour cells and to transmit a measurement report. The UE performs the signal measurements and transmits the measurement report, which comprises the measurement results for at least one neighbour cell and further includes, for at least one reported neighbour cell, an associated unique cell identifier together with the corresponding measurement. The base station identifies a corresponding neighbour cell, from among a plurality of neighbour cells, based on the reported unique cell identifier, and triggers a communication procedure involving the UE and that neighbour cell.

10 Claims, 11 Drawing Sheets

(58) Field of Classification Search
CPC ......... H04W 36/0085; H04W 36/0088; H04W 36/0094; H04W 48/00; H04W 48/16
See application file for complete search history.

(56) References Cited

U.S. PATENT DOCUMENTS

| | | | |
|---|---|---|---|
| 2005/0266853 A1* | 12/2005 | Gallagher | H04W 16/16 455/439 |
| 2010/0297955 A1 | 11/2010 | Marinier et al. | |
| 2011/0028181 A1* | 2/2011 | Byun | H04W 36/0085 455/67.11 |
| 2011/0183676 A1* | 7/2011 | Lee | H04W 36/0072 455/438 |
| 2012/0071169 A1* | 3/2012 | Olofsson | H04W 16/24 455/446 |
| 2012/0142356 A1* | 6/2012 | Serravalle | H04W 36/0016 455/436 |
| 2014/0022803 A1 | 1/2014 | Liu et al. | |
| 2014/0287726 A1* | 9/2014 | Jang | H04W 12/10 455/411 |
| 2016/0234710 A1 | 8/2016 | Jung | |
| 2017/0055186 A1 | 2/2017 | Donepudi et al. | |
| 2017/0245115 A1* | 8/2017 | Lei | H04W 64/006 |
| 2019/0037417 A1* | 1/2019 | Lei | H04W 72/542 |
| 2019/0174481 A1* | 6/2019 | Wei | H04W 72/0406 |
| 2019/0182614 A1* | 6/2019 | Monogioudis | G01S 5/02521 |

FOREIGN PATENT DOCUMENTS

| | | |
|---|---|---|
| JP | 2016-146669 A | 8/2016 |
| JP | 2016-530852 A | 9/2016 |
| KR | 101742552 B1 * 5/2017 ........ H04W 36/0061 |
| WO | 2008/113373 A8 | 9/2008 |
| WO | 2015/046104 A1 | 4/2015 |

OTHER PUBLICATIONS

Ericsson, "s-Measure configuration and UE behaviour". 3GPP TSGRAN WG2 #100, Tdoc R2-1714139, Dec. 2, 2017, USA.
Rachid El Hattachi, et al., "NGMN 5G White Paper", Next Generation Mobile Networks (NGMN) Alliance, Version 1.0, Feb. 17, 2015, pp. 1-125.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.0.0, Dec. 2017, pp. 1-338.
"ANR framework in NR", Ericsson, 3GPP TSG-RAN WG2 #99, R2-1708581, Berlin, Germany, Aug. 21-25, 2017, pp. 1-4.
"Optimized handover in the presence of PCT confusion", Qualcomm Europe, 3GPP TSG RAN WG2 62bis, Tdoc-R2-083268, Jun. 30-Jul. 4, 2008, Warsaw, Poland, p. 1-5.
British Search Report for GB1800569.4 dated Jun. 20, 2018.
International Search Report for PCT/JP2018/048597 dated Mar. 1, 2019 (PCT/ISA/210).
Written Opinion for PCT/JP2018/048597 dated Mar. 1, 2019 (PCT/ISA/237).
JP Office Action for JP Application No. 2022-088134, dated Jul. 11, 2023 with English Translation.

* cited by examiner

DETERMINING HANDOVER TARGET CELL AMONG NEIGHBOUR CELLS BASED ON MEASUREMENT REPORT AND CELL IDENTIFIER

CROSS REFERENCE TO RELATED APPLICATIONS

This application is a National Stage of International Application No. PCT/JP2018/048597 filed Dec. 28, 2018, claiming priority based on British Patent Application No. 1800569.4 filed Jan. 12, 2018, the disclosures of which is incorporated herein in its entirety by reference.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to determining a handover target cell in the so-called 'Next Generation' systems involving multiple home base stations within the coverage of a macro cell.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. A base station may also be referred to as a transmission and reception point (TRP). For simplicity, the present application will use the term base station to refer to any such base stations and use the term mobile device or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

The term macro base station refers to base stations having one or more macro cells (cells that cover a relatively large geographical area) whilst the term small cell refers to a cell that covers a relatively small geographical area (e.g. a home or office and/or the like) often overlapping with a macro cell. A small cell (or pico cell) may be operated by a small cell base station or home base station ('HeNB' or 'HNB') and/or the like. However, such small cells are also often controlled—indirectly—by a macro eNB, e.g. the macro base station that operates the macro cell with which the small cell overlaps. Therefore, at least in the case of macro base stations, a single base station may operate and/or control a large number of cells, e.g. hundreds (in LTE) or thousands of cells (in NR).

Each base station is associated with a unique base station identifier (such as an 'eNB-ID' and/or the like). The base station identifier (which may form part of, or be the same as, a corresponding cell identifier) can be used to uniquely identify each individual cell. When a cell identifier is combined with a network identifier (e.g. a public land mobile network (PLMN) identifier) it can provide substantially unique identification on a global level. As described in section 8.2 of 3GPP Technical Specification (TS) 36.300 V15.0.0, the so-called E-UTRAN Cell Global Identifier (ECGI) may be used to identify cells globally.

In 3G/LTE networks, a typical macro base station serves a limited number of cells, e.g. three sectors/cells, although it may control a number of home base stations. However, in NR networks each macro base station (gNB) may serve a relatively large number of cells. This issue is further complicated by the proposed functional split of the gNB between a Central Unit (CU) and one or more Distribution Units (DUs), where each DU may have several cells of its own.

Each cell can be identified using either by its associated Primary Scrambling Code (PSC) and/or Physical Cell Identity (PCI) broadcast in the cell. Due to the typical cell size of HNB/HeNBs being much smaller than macro cells, there can be multiple HNBs/HeNBs within the coverage of a macro cell (eNB/gNB cell) that have the same PSC/PCI. This leads to a condition referred to as PSC/PCI confusion, wherein in a mobility procedure (e.g. during a handover) the source base station is unable to determine the correct target cell for handover from the PSC/PCI included in the measurement report from the mobile device.

One way of addressing the issue of PSC/PCI confusion is to configure, after receiving the measurement results (including PSC/PCI), the mobile device to report the global cell identity of the target HNB/HeNB to the source base station. This is illustrated in FIG. 4 which corresponds to the procedure described in section 10.5.1.2 of 3GPP TS 36.300, the contents of which are incorporated herein by reference. However, as shown in steps 5 to 7 of FIG. 4, reporting the global cell identity of the target base station to the source base station causes handover delay and requires the mobile device to perform additional signalling with the serving base station and acquisition of system information from the measured base stations (which may also affect the power consumption of the mobile device).

SUMMARY OF INVENTION

However, the inventors have identified further PSC/PCI confusion scenarios that cannot be addressed by existing mechanisms. For example, in networks supporting E-UTRAN New Radio-Dual Connectivity (EN-DC) and/or Next Generation-Dual Connectivity (NGEN-DC), while a compatible UE is connected to an E-UTRAN (LTE) cell and it is ready to establish dual connectivity between a LTE cell and a NR cell, the UE sends a measurement report with respect to the detected NR cells to its current LTE base station (since it is the LTE base station that makes a decision about SgNB addition, i.e. about adding an NR cell to the dual connectivity configuration for that UE). The measurement result of detected NR cells is reported together with their NR PCI (the measurement object defines the frequency). However, PCI confusion may happen in at least the following scenarios:

1) More than one neighbour gNB has a cell with the same NR PCI configuration (lack of uniqueness with the coverage of one LTE cell as shown in FIG. 6); and
2) More than one served NR cell of the target gNB has the same NR PCI configuration (lack of uniqueness with the one gNB as shown in FIG. 7).

In the first scenario, the serving LTE base station (eNB) is unable to determine to which gNB it needs to send the SgNB addition request, and in the second scenario the target gNB is unable to determine in which NR cell/DU it needs to reserve resources for the UE (even if the eNB is able to determine the correct gNB based on the PCI of the NR cell).

The inventors expect the above described PCI confusion scenarios to become very common with the deployment of more and more NR base stations and HNBs and they realised that current mechanisms cannot be adopted to address these scenarios. Accordingly, preferred example embodiments of the present invention aim to provide methods and apparatus which address or at least partially deal with the above issues.

Although for efficiency of understanding for those of skill in the art, the invention will be described in detail in the context of a 3GPP system (5G networks), the principles of the invention can be applied to other systems in which a large number of base stations and cells are deployed.

In one example aspect, the invention provides a method performed by base station apparatus in a communication system including a plurality of cells where a respective physical cell identifier (PCI) is associated with each of the cells, the method including: transmitting, to a user equipment (UE), a measurement configuration for configuring that UE to carry out measurements of signals transmitted in each of a plurality of neighbour cells and to transmit a measurement report including at least one result of a configured measurement for at least one neighbour cell of said plurality of neighbour cells; receiving the measurement report transmitted by the UE, based on said measurement configuration, and including the at least one result of a configured measurement, wherein the measurement report further includes, for each of at least a subset of the at least one neighbour cell to which the at least one measurement result relates, a respective unique cell identifier (e.g. globally unique cell identifier) together with the corresponding at least one measurement; and identifying, based on at least one unique cell identifier received in the measurement report, a corresponding neighbour cell, from among said plurality of cells, for triggering a corresponding communication procedure involving the UE and the identified neighbour cell.

In another example aspect, the invention provides a method performed by base station apparatus in a communication system including a plurality of cells where a respective physical cell identifier (PCI) is associated with each of the cells, the method including: transmitting, to a user equipment (UE), a measurement configuration for configuring that UE to carry out measurements of signals transmitted in each of a plurality of neighbour cells and to transmit a measurement report including at least one result of a configured measurement for at least one neighbour cell of said plurality of neighbour cells; receiving the measurement report transmitted by the UE, based on said measurement configuration, and including the at least one result of a configured measurement, wherein the measurement report further includes at least one PCI of the at least one neighbour cell to which the at least one measurement result relates together with the corresponding at least one measurement; identifying, based on a Neighbour Relation Table (NRT) and the received at least one PCI, a neighbour cell, from among said plurality of cells, for triggering a corresponding communication procedure involving the UE and the identified neighbour cell.

In another example aspect, the invention provides a method performed by base station apparatus in a communication system including a plurality of cells where a respective physical cell identifier (PCI) is associated with each of the cells, the method including: receiving a message, from different base station apparatus, for triggering a communication procedure involving a user equipment (UE) served by the different base station apparatus and a cell identified by an associated PCI; and determining, based on a Neighbour Relation Table (NRT) and the received PCI, whether or not the received message relates to a cell controlled by the base station apparatus.

In another example aspect, the invention provides a method performed by base station apparatus in a communication system including a plurality of cells where a respective physical cell identifier (PCI) is associated with each of the cells, the method including: transmitting, to a user equipment (UE), a measurement configuration for configuring that UE to carry out measurements of signals transmitted in each of a plurality of neighbour cells and to transmit a measurement report including at least one result of a configured measurement for at least one neighbour cell of said plurality of neighbour cells; receiving the measurement report transmitted by the UE, based on said measurement configuration, and including the at least one result of a configured measurement, wherein the measurement report further includes information identifying a geographical location associated with the UE (e.g. GPS coordinates) and a respective physical cell identifier (PCI) associated with each cell to which the at least one result relates; and identifying, based on a Neighbour Relation Table (NRT) and the received measurement report, a neighbour cell, from among said plurality of cells, for triggering a corresponding communication procedure involving the UE and the identified neighbour cell.

In another example aspect, the invention provides a method performed by user equipment (UE) in a communication system including a plurality of cells where a respective physical cell identifier (PCI) is associated with each of the cells, the method including: receiving, from base station apparatus, a measurement configuration for configuring the UE to carry out measurements of signals transmitted in each of a plurality of neighbour cells and to transmit a measurement report including at least one result of a configured measurement for at least one neighbour cell of said plurality of neighbour cells; transmitting the measurement report, based on said measurement configuration, and including the at least one result of a configured measurement, wherein the measurement report further includes, for each of at least a subset of the at least one neighbour cell to which the at least one measurement result relates, a respective unique cell identifier together with the corresponding at least one measurement for use by the base station apparatus in identifying a corresponding neighbour cell, from among said plurality of cells, for triggering a corresponding communication procedure involving the UE and that neighbour cell.

In another example aspect, the invention provides a method performed by user equipment (UE) in a communication system including a plurality of cells where a respective physical cell identifier (PCI) is associated with each of the cells, the method including: receiving, from base station apparatus, a measurement configuration for configuring the UE to carry out measurements of signals transmitted in each of a plurality of neighbour cells and to transmit a measurement report including at least one result of a configured measurement for at least one neighbour cell of said plurality of neighbour cells; performing signal measurements, based on said measurement configuration; and transmitting, to the base station apparatus, a measurement report including the at least one result of a configured measurement, wherein the measurement report further includes information identifying a geographical location associated with the UE (e.g. GPS coordinates) and a respective physical cell identifier (PCI) associated with each cell to which the at least one result relates.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

<Overview>

Figure 1:
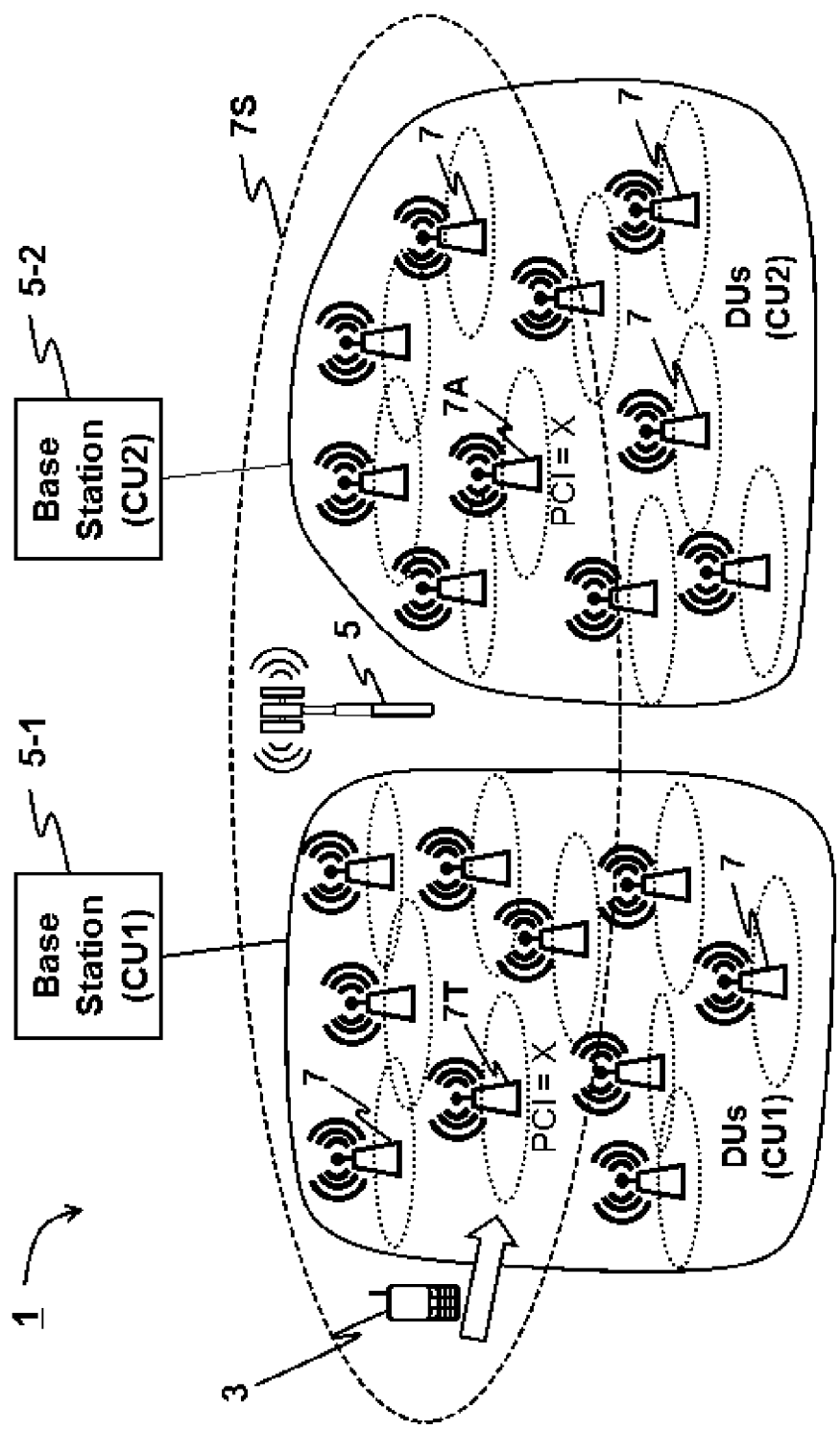
FIG. 1 illustrates schematically a cellular telecommunication system to which example embodiments of the invention may be applied.

FIG. 1 schematically illustrates a telecommunications network 1 in which mobile devices 3 (mobile telephones and/or other user equipment) can communicate with each other via base stations 5 (e.g. LTE base stations ('eNBs') and/or 5G base stations ('gNBs')) and a core network (not shown) using an appropriate radio access technology (RAT). As those skilled in the art will appreciate, whilst one mobile device 3 and three base stations 5, 5-1, 5-2 are shown in FIG. 1 for illustration purposes, the system, when implemented, will typically include other base stations and communication devices.

Each base station 5 operates one or more associated cell 7. Mobile devices 3 connect to an appropriate cell 7 (depending on their location and possibly on other factors, e.g. signal conditions, subscription data, capability, and/or the like) by establishing a radio resource control (RRC) connection with the base station 5 operating that cell 7.

In the example shown in FIG. 1, the base station 5 is an LTE base station (eNB) that operates (controls) the cell 7S currently serving the mobile device 3. In this example, the serving cell 7S is a macro cell having a relatively large coverage area, although in other examples it may be a small cell (a HNB cell and/or the like). The base stations 5-1 and 5-2 are NR base stations (gNBs) (although they may also include an eNB portion) having an architecture in which the functions of the base station are split between a Central Unit (CU) and corresponding Distribution Units (DUs) (at least one DU). Specifically, the CU is a logical node that performs a subset of base station functions (e.g. transfer of user data, mobility control, radio access network sharing, positioning, session management) whilst the remaining base station functions are performed by the associated DU(s). The CU controls the operation of its associated DU(s) over an appropriate front-haul (Fs) interface (which may include separate user-plane and control-plane Fs interfaces). The CU may also be referred to as BBU/REC/RCC/C-RANN-RAN and the DU may also be referred to as RRH/RRU/RE/RU.

Each base station 5 is connected to the core network via an appropriate core network interface, such as the S1 interface (in LTE) and/or the N2/N3 interfaces (in 5G). The base station 5 is also connected to neighbouring base stations (either directly or through a (home) base station gateway) via an appropriate base station interface, such as the X2 interface (in LTE) and/or the Xn interface (in 5G).

The core network includes, amongst others, one or more appropriate user-plane functions (UPFs) and one or more control-plane functions (CPFs) for keeping track of the locations of the mobile devices 3 within the communication network 1 (e.g. a Mobility Management Entity (MME) or an Access and Mobility Management Function (AMF)), for storing subscription related information for each UE (e.g.

information identifying which mobile device 3 is configured as a machine-type communication device), for storing applicable control parameters for each mobile device 3, and for handling respective traffic flows for each mobile device 3 in accordance with applicable policies (including e.g. network, subscription, charging policies and/or the like). Although these are also omitted from FIG. 1 for simplicity, the core network will typically include one or more gateways for connecting to other (external) networks, such as the Internet and/or to servers hosted outside the core network.

The base stations 5-1 and 5-2 operate a number of associated cells 7 via respective DUs. In this example, each DU has one or more associated cell 7 (all of which are controlled by the CU coupled to that DU). Each cell has an associated cell identifier (PCI and/or the like). The telecommunications network 1 makes beneficial use of Automatic Neighbour Relation (ANR) functionality. Therefore, each base station 5 is configured to store and maintain an appropriate neighbour relations table (NRT) for each cell 7 operated by that base station 5 (either directly or via the associated DU). Further details of the ANR functionality and the NRT may be found in 3GPP TS 36.300, section 22.3.2a, the contents of which are summarised at the end of the description.

As can be seen, the mobile device 3 is currently served by a cell 7S controlled by the base station 5. However, due to movement of the mobile device 3, in the direction indicated by the arrow in FIG. 1, the base station 5 needs to initiate a handover for the mobile device 3 to a suitable target cell 7T. In order to do so, the base station 5 configures the mobile device 3 to carry out appropriate signal measurements for a number of cells 7 in the vicinity of the mobile device 3 and to report back the results of such measurements (e.g. when certain conditions are met, e.g. a candidate cell 7 with a sufficiently strong single is found during the signal measurements). In another example, the mobile device 3 may be served by the cell 7S as a primary cell or 'PCell' (which may be e.g. an LTE cell) and the base station 5 may attempt to configure dual connectivity for the mobile device 3 involving cell 7T as a secondary cell or 'SCell'. Similarly to the handover example, the base station 5 will configure the mobile device 3 to carry out appropriate signal measurements and to report back the result of the measurements to the base station 5.

Due to the potentially large number of cells (DUs) in a given geographical area (especially in case of small cells) it is possible that more than one cell 7 has the same PCI (or the same PSC) configuration. In this example, both cell 7T and 7A is configured with the same PCI value ('X'). In other words, at least some of the cells 7 may lack uniqueness within the coverage of a larger cell (e.g. a macro cell) or in the vicinity of a current serving cell 7S for the mobile device 3. This scenario corresponds to the one illustrated in FIG. 6.

Moreover, due to the potentially large number of cells 7/DUs controlled by the same base station 5 (CU) it is possible that more than one cells 7 of that base station 5 will have the same PCI (or the same PSC) configuration. In other words, at least some of the cells 7T and 7A may lack uniqueness within the geographical area served by a particular base station 5 (CU). This scenario corresponds to the one illustrated in FIG. 7.

In this system, the mobile device 3 and the base stations 5 are beneficially configured to avoid any confusion arising from the above described scenarios by performing appropriate procedures for uniquely identifying a particular cell 7 (e.g. a handover target cell or a secondary cell for dual connectivity) regardless whether a split CU/DU architecture is used and whether uniqueness of PCI (or PSC) is ensured across a given area (e.g. among the cells 7 in the vicinity of the mobile device 3 and/or the cells controlled by a particular base station 5).

In more detail, the mobile device 3 and the base stations 5 may be configured to follow one (or more) of the following options, including any combination thereof:

The mobile device 3 may be configured to automatically send, to its serving base station 5, the GCI for each of at least a subset of the reported cells 7, together with the configured measurement results for that cell, without requiring a separate system information (SI) request (i.e. for a subset of the reported cells 7 including the strongest cell or cells). The base station 5 may, thus, be configured to determine the correct cell 7T (the base station 5-1 controlling that cell 7T) based on the GCI without separately reconfiguring the UE to read the system information (e.g. by sending a separate reconfiguration message including an SI request).

The mobile device 3 may be configured to send, to its serving base station 5, the PSC/PCI for each reported cell 7 (as per normal operation) and send the GCI of one or more cells 7 upon request by the base station 5 (e.g. in response to receiving a request from the base station 5 for the GCI of a particular cell 7 or in response to receiving a new measurement configuration for a particular cell 7). The base station 5 may be configured to determine the GCI from information stored in the Neighbour Relation Table and the reported PSC/PCI before requesting the GCI from the mobile device 3.

The mobile device 3 may be configured to report the GCI for a subset (a predetermined number and/or type of cells) of all measured cells 7 and report the associated PSC/PCI for the remaining cells. The base station 5 may be configured to determine the correct cell 7T (the base station 5-1 controlling that cell 7T) based on either the GCI or the PSC/PCI, whichever is available for that cell 7T, without requesting the GCI from the mobile device 3. The base station 5 may be configured to determine the GCI from information stored in the Neighbour Relation Table and the reported PSC/PCI.

The mobile device 3 may be configured to send, to its serving base station 5, the PSC/PCI for each reported cell 7 (as per normal operation). If the base station 5 cannot determine the GCI based on the PSC/PCI, it may forward the PSC/PCI to one of the neighbour base stations operating a cell with that PCI (e.g. gNB 5-1 or 5-2 operating cells 7T and 7A, respectively). The neighbour base station 5-1/5-2 may be configured to determine the correct cell 7T from information stored in the Neighbour Relation Table and the PSC/PCI received from the serving base station 5.

The serving base station 5 may be configured to determine the GCI from information stored in its Neighbour Relation Table and a geographical location of the mobile device 3 (reported by the mobile device 3 with the measurement results or in a separate procedure, e.g. upon request by the serving base station 5).

In all options, the base stations (the eNB/gNB 5 controlling the UE's current cell 7S and/or the eNB/gNB 5-1 controlling the target cell 7T) may be configured to use the GCI (e.g. instead of the associated PSC/PCI) for identifying the cell 7T in handover and/or dual connectivity procedures.

Beneficially, therefore, the serving base station 5 is able to determine which cell 7T/which base station 5-1, 5-2 (CU1, CU2) it needs to communicate with, and the target base station 5-1 is able to determine the cell 7T in which it needs to reserve resources for the mobile device 7 (for handover and/or dual connectivity involving that cell 7T).

<Mobile Device>

Figure 2:
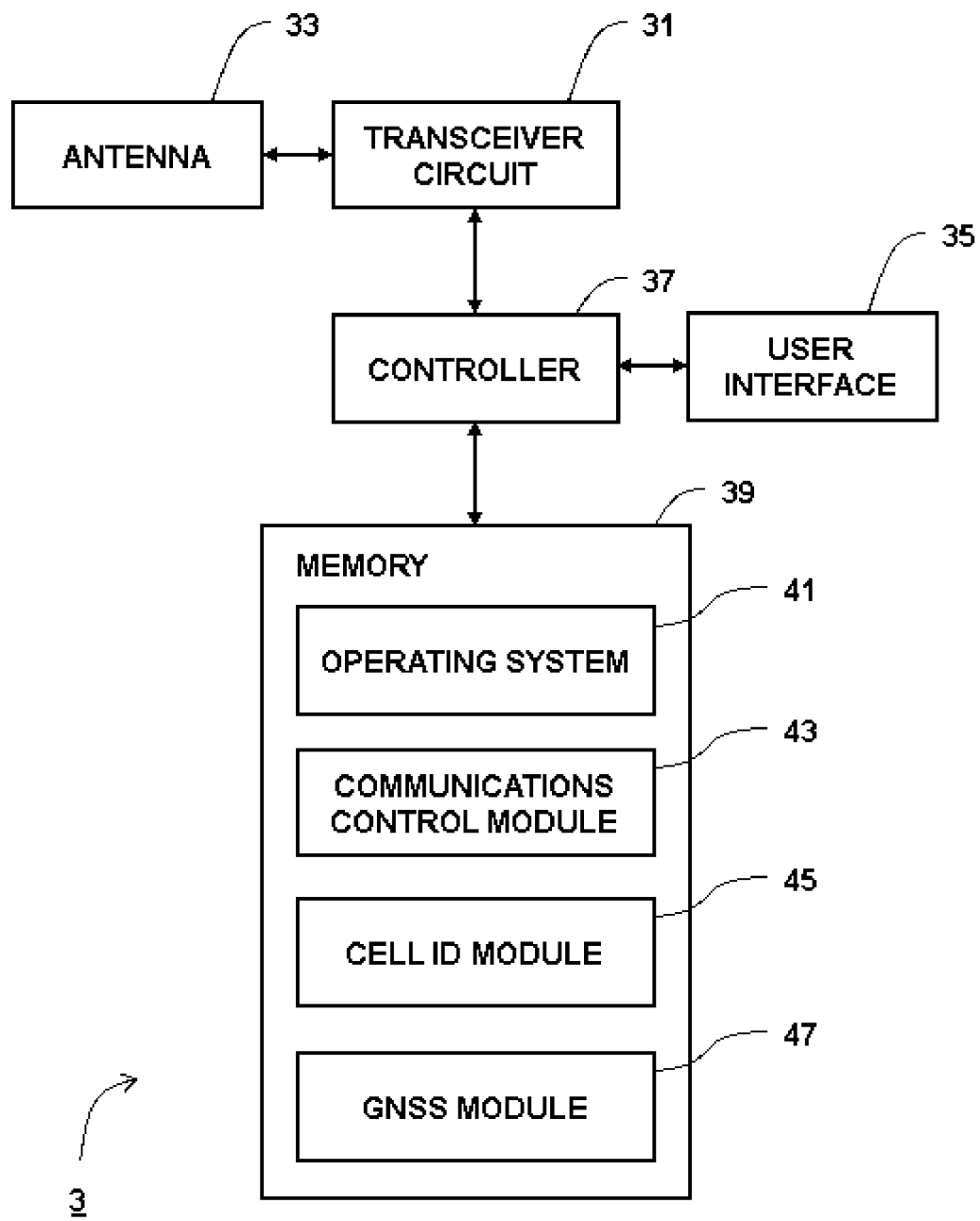
FIG. 2 is a schematic block diagram of a mobile device forming part of the system shown in FIG. 1.

FIG. 2 is a block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate.

Software may be pre-installed in the memory 39 and/or may be downloaded via the telecommunications network or from a removable data storage device (RMD), for example. The controller 37 is configured to control overall operation of the mobile device 3 by, in this example, program instructions or software instructions stored within memory 39. As shown, these software instructions include, among other things, an operating system 41, a communications control module 43, a cell ID module 45, and an optional Global Navigation Satellite System (GNSS) module 47.

The communications control module 43 is operable to control the communication between the mobile device 3 and the base stations 5 (and other communication devices connected to the serving base station 5, such as further mobile devices and/or network nodes). The communications control module 43 is also responsible for the acquisition of system information (for the current serving cell and optionally for neighbouring cells), for carrying out appropriate signal measurements over the cells 7 for which the serving base station 5 has configured such measurements, and for reporting the results of the signal measurements to the serving base station 5.

The cell ID module 45 is responsible for obtaining information for identifying each cell 7 (at least those cells 7 that are in the vicinity of the mobile device 3) and using such information in subsequent procedures involving these cells 7 (for example, when reporting the measurement results for that cell 7, a handover to that cell 7, and/or the like). The information for identifying a particular cell 7 may include one or more of: an appropriate PLMN ID associated with that cell 7; a cell identifier (ECI/NCI) associated with that cell 7; a PCI associated with that cell 7; a PSC associated with that cell 7; a global cell identifier (GCI/EGCI) associated with that cell 7; and a TAC associated with that cell 7. The cell ID module 45 may obtain the information for identifying a given cell 7 from the system information acquired by the communications control module 43.

If present, the GNSS module 47 is responsible for obtaining information for determining a current geographical location of the mobile device 3 (e.g. GPS coordinates). The GNSS module 47 may be provided in the form of a Global Positioning System (GPS) module, a Global Navigation Satellite System (GLONASS) module, a Galileo module, a Beidou module, and/or the like.

<Base Station>

Figure 3:
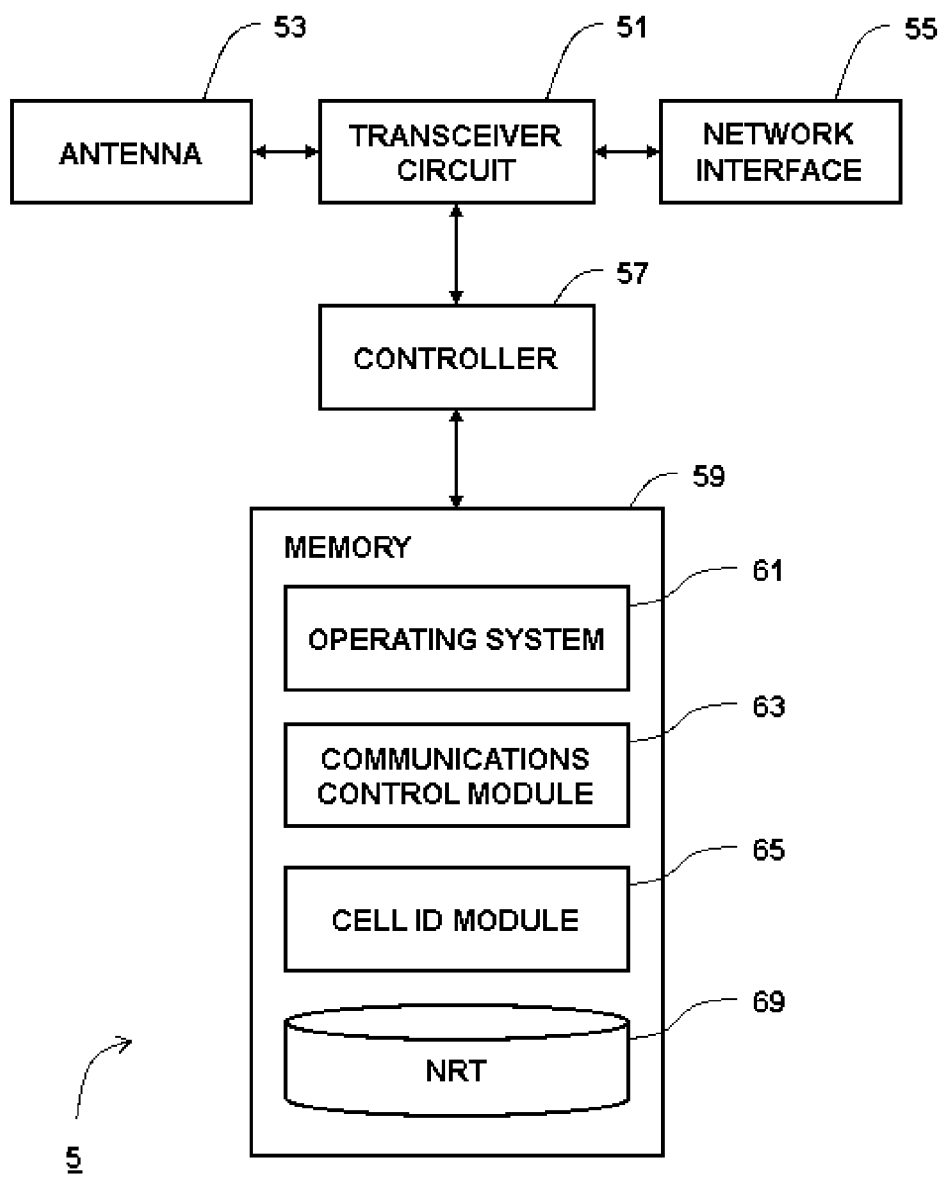
FIG. 3 is a schematic block diagram of a base station forming part of the system shown in FIG. 1.

FIG. 3 is a block diagram illustrating the main components of one of the base stations 5 shown in FIG. 1. As shown, the base station 5 has a transceiver circuit 51 for transmitting signals to and for receiving signals from the communication devices (such as mobile devices 3/user equipment) via one or more antenna 53 and a network interface 55 for transmitting signals to and for receiving signals from the core network (via an appropriate core network interface such as an S1/N2/N3 interface) and for transmitting signals to and for receiving signals from neighbouring base stations (via an appropriate base station interface such as an X2/Xn interface). The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, a cell ID module 65, and a Neighbour Relation Table (NRT) 69. Although not shown in FIG. 3 for simplicity, some of these functions and modules may be split between a CU and one or more DUs, if appropriate, whilst other functions (e.g. transceiver/controller) and modules may be provided in both the CU and the DU(s).

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5. The communications control module 63 is also responsible for configuring appropriate signal measurements for the mobile devices 3 served by the base station 5 and for obtaining the results of the signal measurements (via appropriate higher layer signalling, e.g. RRC).

The cell ID module 65 is responsible for obtaining and storing (in the NRT 69) information for identifying cells 7 of the communication system 1 (at least for the base station's own cell(s) and any neighbouring cell) and for using such information in procedures involving these cells 7. The information for identifying a particular cell 7 may include one or more of: an appropriate PLMN ID associated with that cell 7; a cell identifier (ECI/NCI) associated with that cell 7; a PCI associated with that cell 7; a PSC associated with that cell 7; a global cell identifier (GCI/EGCI) associated with that cell 7; and a TAC associated with that cell 7. The cell ID module 65 is also responsible for broadcasting information for the base station's own cell(s) 7 via the system information.

The NRT module 69 is responsible for procedures relating to automatic neighbour relations and includes an appropriately formatted Neighbour Relations Table (per cell).

In the above description, the mobile device 3 and the base station 5 are described for ease of understanding as having a number of discrete modules (such as the communications control modules and the cell ID modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

The following is a description of some of the exemplary ways in which PCI confusion may be avoided by the mobile device 3 and the base station 5 in accordance with example embodiments of the present invention.

Option 1

In E-UTRAN, the global cell identity of each cell includes 28 bits and it is constructed from an identifier of the public land mobile network (PLMN) that the cell belongs to and the cell identity (CI) of that cell (within that PLMN). In E-UTRAN, the cell identity is known as the E-UTRAN cell identity (ECI). In case of macro cells (and small cells controlled by a macro base station), each (E)CI includes (as the left 18, 20, 21, or 28 bits) the eNB ID of the macro base station that controls that cell and the remaining bits (if any) are the cell identifier for that cell (unique within that base station).

In NR, the global cell identity is defined similarly to that of LTE. However, in NR, the cell identity is referred to as the NR cell identity (NCI) and the ECGI of each cell includes 36 bits (constructed from the associated PLMN ID+NCI). Each NCI includes the gNB ID (22-32 bits) of the macro base station that controls that cell and the remaining bits are the cell identifier for that cell (unique within that base station).

The global cell identity associated with a given cell 7 is broadcast via the system information (SI) by the base station 5 that controls that cell 7. Thus, by acquiring the SI from each measured cell 7 (e.g. step S1b), the mobile device 3 is able to obtain the corresponding global cell identity.

Figure 4:
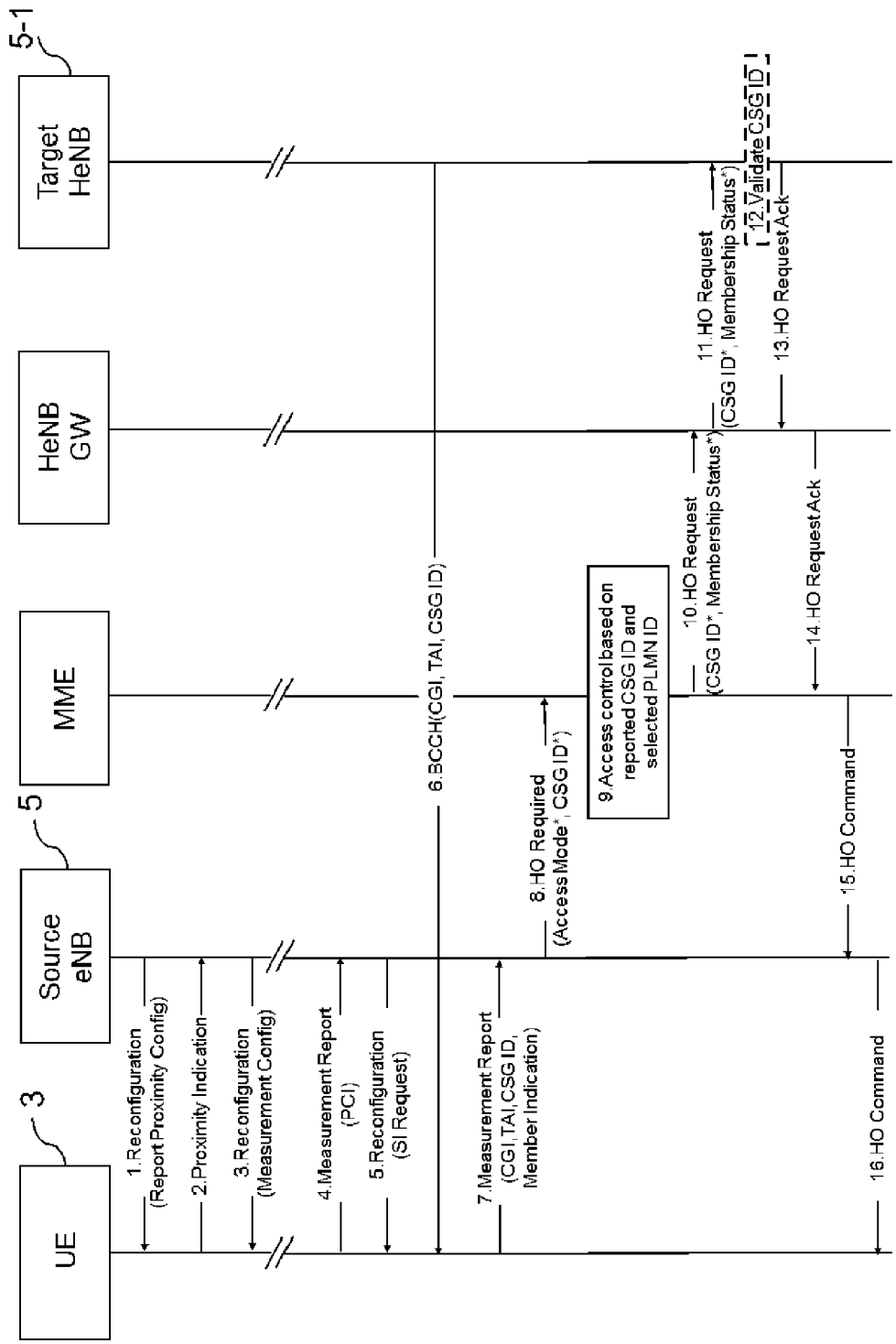
FIG. 4 is a schematic timing diagram illustrating an exemplary way in which cell identifiers may be resolved in a cellular telecommunication system (e.g. LTE)
Figure 5A:
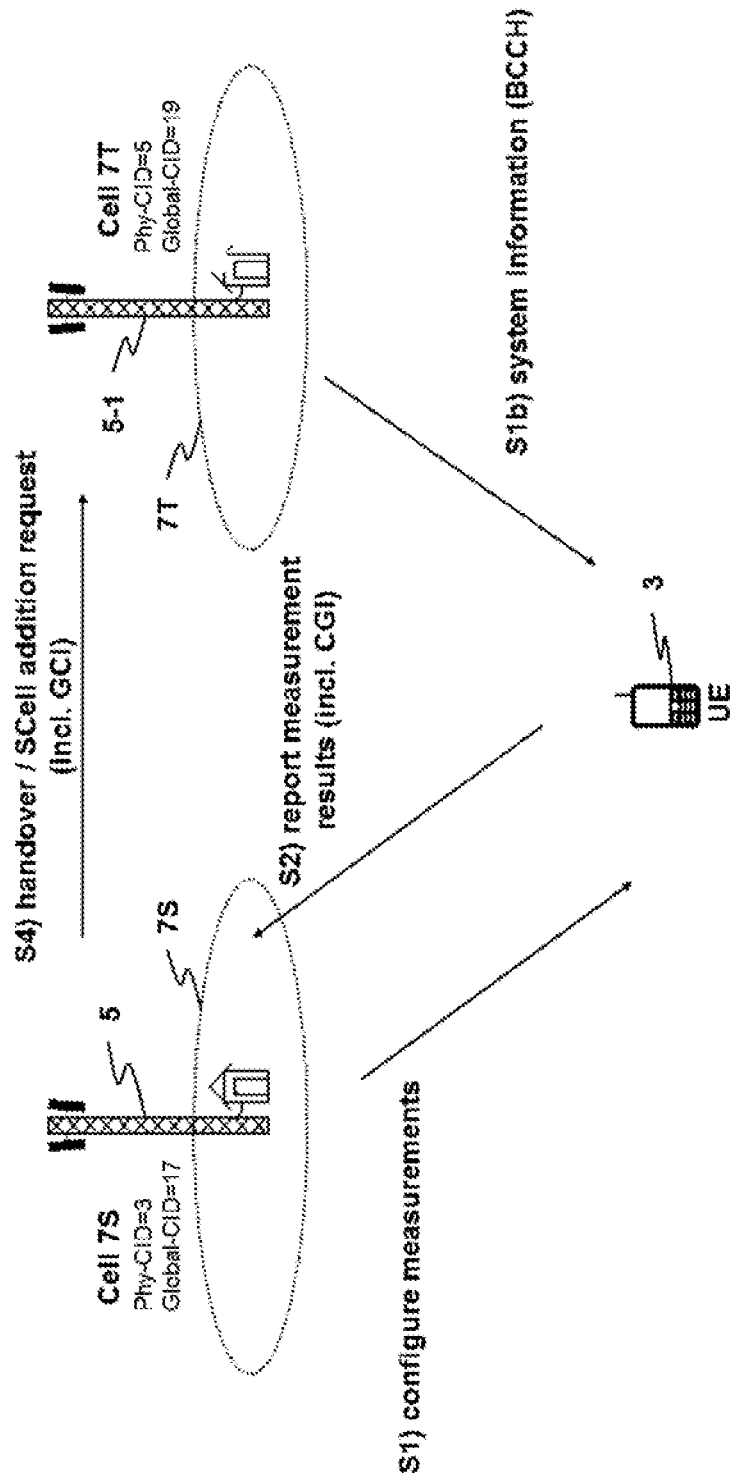
FIG. 5a is a schematic diagram illustrating an exemplary way in which PSC/PCI confusion may be addressed in the system shown in FIG. 1.

One way of addressing the issue of PCI confusion is illustrated in FIG. 5a. In this option, as generally illustrated in step S1, the mobile device 3 is configured to report (automatically) the global cell identity (GCI or ECGI) of the target cell 7T to the serving base station 5 (e.g. in addition to or instead of the PCI), together with the measurement results. For example, the cell ID module 45 of the mobile device 3 may be configured to include the corresponding global cell identity for each cell 7 that is included in the measurement report to the base station 5 (sent via the communications control module 43 in step S2). In other words, step S2 of FIG. 5a may be regarded as a modification of step 4 of FIG. 4 (to include the global cell identity of each measured cell 7).

It will be appreciated that a global cell identity (such as ECGI) can be used to uniquely identify a cell in the whole network, hence, the base station 5 is able to determine the correct cell 7T (and the base station 5-1 controlling that cell 7T) and perform handover/cell addition (step S4) based on the information included in the measurement report. On the other hand, reporting the global cell identity of each cell 7 that is included in the measurement report to the serving base station 5 may cause handover delay and it may require the mobile device 3 to perform additional system information (SI) acquisitions, possibly for multiple cells, which may also affect the power consumption of the mobile device 3. Nevertheless, handover delay and associated signalling may still be reduced in this example because, compared to FIG. 4, steps 5 and 7 may be omitted (and step 6 is performed earlier).

Option 2

In this option the mobile device 3 is configured to provide the global cell identities for a subset of the reported cells 7 (although it may also be configured to report their PCI only).

In more detail, the mobile device 3 may be configured to report (using its cell ID module 45 and communications control module 43) the global cell identity for a predetermined subset (a predetermined number) of cells 7 in its measurement report to the base station 5 (e.g. the cell 7 or a number 'N' of cells 7 having the strongest signal and/or the cells 7 that are likely to have a PCI confusion issue). Effectively, this corresponds to the scenario described with reference to FIG. 5a. In this case, the measurement report from mobile device 3 may identify any remaining cells 7 (e.g. the cells 7 that do not have the strongest signal) by their associated PCI (hence the mobile device 3 does not need to obtain system information for such remaining cells 7).

If the base station 5 does not find a suitable handover cell among the cells 7 for which the global cell identity has been reported and if the selected (suitable) handover target cell 7T has a potential PCI confusion issue, then the base station 5 may either proceed with the handover (which may still succeed) to that cell 7T or it may request the mobile device 3 to obtain and report the global cell identity for that particular cell 7T (as described with reference to FIG. 5c below). This option may be particularly beneficial when attempting to set up dual connectivity for the mobile device 3 (in which case the mobile device 3 will maintain its existing connection with its current serving cell 7S and hence the risk of connection loss is relatively low even when the serving base station 5 does not select the correct cell 7T based on its associated PCI).

Option 2-1

Figure 5B:
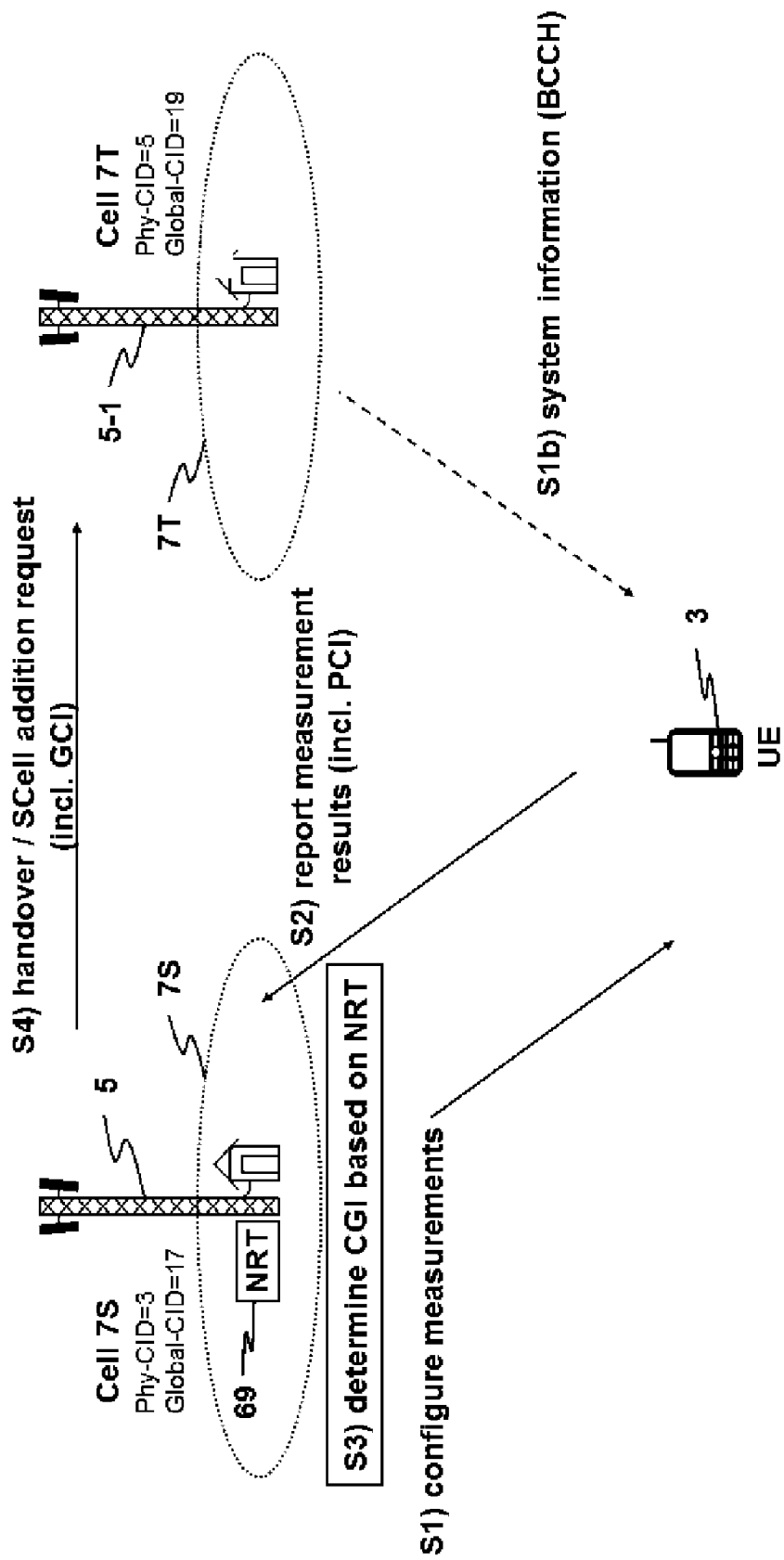
FIG. 5b is a schematic diagram illustrating another exemplary way in which PSC/PCI confusion may be addressed in the system shown in FIG. 1.
Figure 5C:
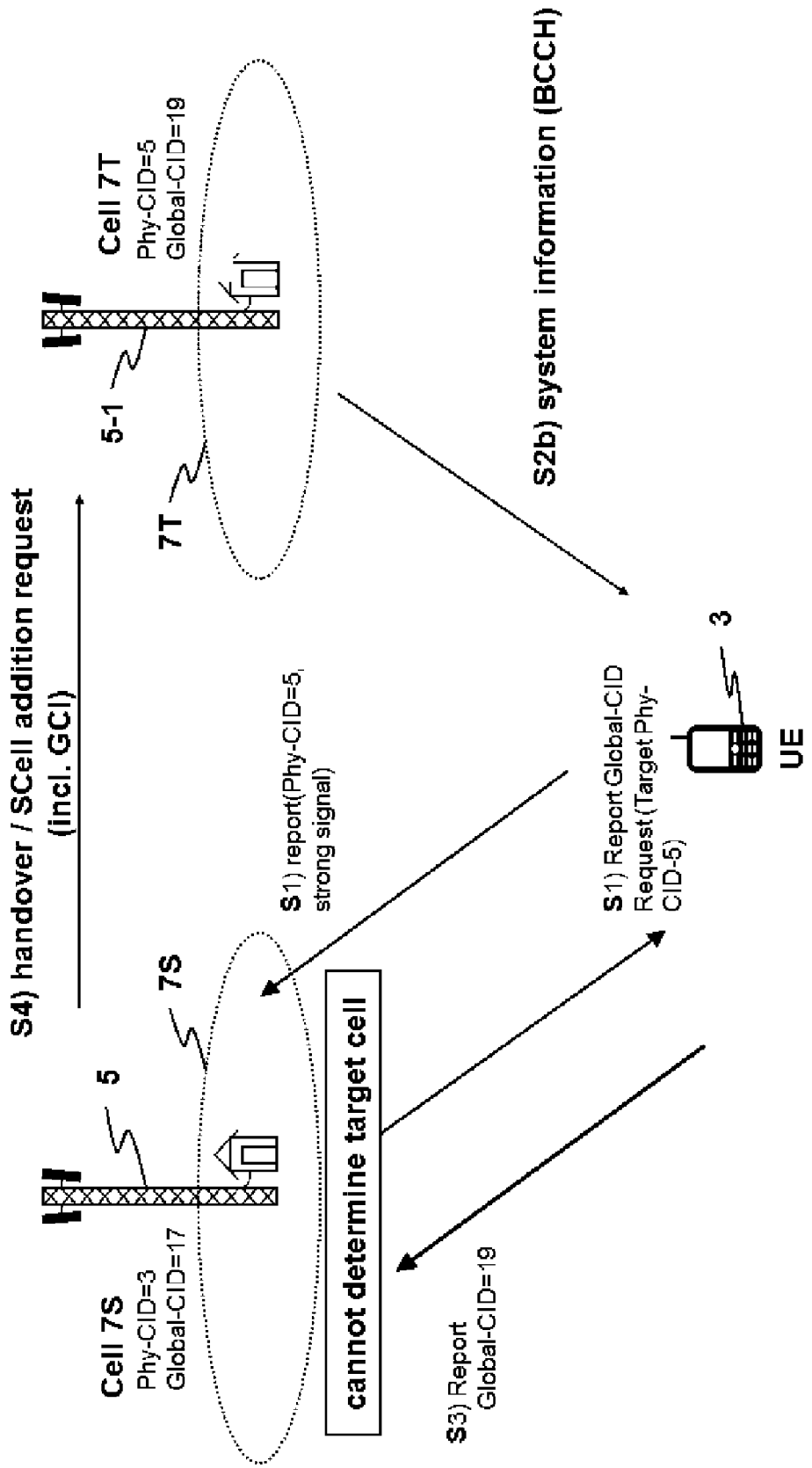
FIG. 5c is a schematic diagram illustrating another exemplary way in which PSC/PCI confusion may be addressed in the system shown in FIG. 1.

A variant of option 2 is illustrated in FIGS. 5b and 5c, in which the mobile device 3 does not report the global cell identity for any cell 7 in the measurement report (although the mobile device 3 may be configured to report the global cell identity for a subset of cells 7 as per option 2).

In this example, the mobile device's current cell 7S may be an LTE/E-UTRAN cell (although it may also be an NR cell/a cell provided via a DU as in FIG. 1) controlled by the base station 5 and the target cell 7T (one of the candidate cells for the UE) is an NR cell (which may be controlled by the same base station 5 or a different base station 5-1).

In this case, the serving base station 5 configures (using its communications control module 63, in step S1 of FIG. 5b) the mobile device 3 for carrying out appropriate signal measurements for one or more neighbour cells 7.

The mobile device 3 is configured to report (using its communications control module 43) the result of those measurements that meet certain predetermined criteria (this is known as event triggering). When reporting the measurement results, as shown in step S2 of FIG. 5b/step S1 of FIG. 5c, the mobile device 3 also reports the PCI associated with the target cell 7T (or multiple Pas when reporting more than one candidate cell 7) to the serving base station 5. Beneficially, in this case it is not necessary for the mobile device 3 to perform system information acquisition (step 1b) at this phase.

In step S3 of FIG. 5b, the base station 5 checks, based on the reported PCI(s) and the information held in its NRT 69, whether the target cell 7T (in case of a handover)/an appropriate secondary cell 7T (in case of dual connectivity) can be determined. If the correct cell 7T can be determined from the measurement report (or when the risk of PCI confusion is determined to be low), then the base station 5 proceeds to triggering, in step S4, a handover to that cell 7T/setting up the cell 7T as a secondary cell for the mobile device 3.

Turning now to FIG. 5c, if the correct cell 7T cannot be determined from the PCI(s) included in the measurement report (S1 in FIG. 5c), then the base station 5 proceeds to generate (using its communications control module 63) and send, in step S2, an appropriately formatted request instructing the mobile device 3 to report the GCI of one or more cells 7 (e.g. any reported cell that does not have a unique PCI in the NRT 69) by including information identifying the one or more cells 7 (e.g. the associated PCI(s)). In this example, the base station 5 requests the mobile device 3 to obtain and report the (E)CGI for the cell 7T with PCI=5 (which cell was reported in step S1 as having a sufficiently strong signal albeit not necessarily the strongest signal).

The mobile device 3 is able to obtain the GCI of a particular cell by acquiring (reading) the system information of that cell 7. Thus, effectively, the base station's request in step S2 configures the mobile device 3 to perform acquisition of system information for the cell 7T associated with that particular PCI (in this example, PCI=5). As generally shown in step S2b, the mobile device 3 performs SI acquisition using autonomous gaps, i.e., the mobile device 3 may temporarily suspend reception and transmission with the base station 5 in order to acquire the relevant system information from the target cell 7T. It will be appreciated that SI acquisition (step S2b) may take place at any time, even before receiving the base station's request in step S2 (e.g. at step S1b of FIG. 5b).

In step S3 the mobile device 3 generates and sends an appropriately formatted response (e.g. a new measurement report) including the GCI ('Global-CID') of the target cell 7T. In this example, the GCI value reported by the mobile device 3 is '19' (for the cell 7T having PCI=5). Beneficially, therefore, based on the PCI value '5' (which may not necessarily be unique within the area served by the base station 5) and the GCI value '19' the base station 5 is able to determine the correct cell 7T for triggering handover/dual connectivity for the mobile device 3.

Based on the determined GCI (step S3 of FIG. 5b) or the reported GCI (step S3 of FIG. 5c), the serving base station 5 is able to select the correct cell 7T (and the correct base station 5-1) for triggering a handover/SCell addition (in step S4)

Option 2-2

This variant is similar to the one illustrated in FIG. 5b.

Similarly to the previous option, the mobile device 3 may be configured to report the global cell identity for a predetermined subset (a predetermined number) of cells 7 in its measurement report to the base station 5 (e.g. a single cell 7 or a number 'N' of cells 7 having the strongest signal and/or any cell 7 that is likely to have a PCI confusion issue). If the base station 5 does not find a suitable handover cell among the cells 7 for which the global cell identity has been reported and if the selected (suitable) handover target cell 7T has a potential PCI confusion issue, then the base station 5 attempts to determine the GCI of the correct target cell 7T based on the NRT 69.

However, rather than using the NRT 69 held by the serving base station 5 for the serving cell 7S, the base station 5 is configured to check the NRT 69 for one of the reported cells 7, preferably a small cell (or NR cell) because such cells have fewer neighbours than macro cells. In a particularly beneficial example, the serving base station 5 is configured to check the NRT 69 for the strongest cell 7 (preferably a small/NR cell having a relatively few neighbours) for which a GCI has been reported by the mobile device 3. In this case, the base station 5 can assume that the target cell 7T (which may have a potential PCI confusion issue) is likely to have a similar good reported signal strength/quality to that of the strongest cell 7, and hence the target cell 7T is most likely a neighbour of the strongest cell for which a GCI has been reported.

In more detail, the mobile device 3 is configured to report the results of signal measurements to the base station 5 as described with reference to step S2 of FIG. 5a or FIG. 5b (i.e. each reported cell may be identified by its PCI or GCI). When the serving base station 5 selects a cell 7T for the mobile device 3 for which no GCI has been reported, the base station 5 is configured to determine the GCI of that cell 7T based on the NRT 69 (instead of requesting the GCI of that cell 7T from the mobile device 3 as described with reference to steps S2 to S3 of FIG. 5c).

Table 1 illustrates some of the fields that may be included in an exemplary Neighbour Relation Table 69 in accordance with this option. It will be appreciated that a similar NRT 69 may be stored in the memory 59 for each cell 7 controlled by the base station 5 and for each neighbour cell (which may be obtained via the network interface 55 from the base station controlling that neighbour cell). As can be seen, for each neighbour cell 7 the NRT 69 of a given cell includes (amongst others): an associated index (in this example, #1 to #6); the associated GCI; information identifying an operating frequency of that cell 7; and the associated PCI.

TABLE 1 exemplary NRT of the strongest (NR) cell reported with GCI

| Cell | GCI | frequency | PCI | ... |
|------|-----|-----------|-----|-----|
| #1   | xxx | m         | x   | ... |
| #2   | xxx | m         | y   |     |
| #3   | xxx | m         | z   |     |
| #4   | xxx | m         | w   |     |
| #5   | xxx | n         | x   |     |
| #6   | xxx | n         | y   |     |
| ...  |     |           |     |     |

Since the base station 5 is responsible for configuring the mobile device's signal measurements (including configuring the frequencies to be measured), the base station 5 is able to determine, from the applicable measurement configuration and the reported measurement results, the frequency of the reported cell 7T. Thus, by considering the frequency and the PCI of that cell 7T, the base station 5 may be able to determine the GCI of the cell 7T based on the information included in the NRT 69 and the reported PCI. Specifically, the base station's determination is based on the NRT 69 for the strongest cell 7 for which a CGI has been reported. In the exemplary NRT 69 shown in Table 1, there are two cells (i.e. #1 and #5) with PCI value 'x' but both cells have a different associated frequency. Thus, in this example, the correct neighbour cell 7T is the cell that is a neighbour to both the UE's current serving cell 7S and the strongest cell and having a frequency for which a measurement has been configured. It will be appreciated that other techniques may also be used for identifying the correct neighbour cell 7T based on the PCI and the NRT 69 for the strongest cell 7 for which a CGI has been reported. In some examples, the base station 5 may be configured to check the PCI in the NRT 69 for more than one cell 7.

Accordingly, when the base station 5 is triggering a handover (or dual connectivity) for the mobile device 3 for cell 7T, in step S4, the base station 5 may beneficially use the GCI of that cell to manage the handover (or dual connectivity) thereby avoiding connection failure arising due to PCI confusion.

It will be appreciated that, instead of the frequency of the neighbour cell 7, the base station 5 may use any other suitable information (from the NRT 69 and/or other source, including other nodes) in order to determine the GCI of the correct cell 7T without involving the mobile device 3.

Beneficially, in this option the base station 5 may be able to resolve (based on the NRT 69 for the strongest cell) the correct neighbour cell 7T, even in cases where the NRT for the serving cell's 7S (e.g. when it is a macro/LTE cell) may not be sufficient, for example due to the large number of neighbour cells listed in the NRT for the serving cell's 7S.

Option 2-3

Figure 5D:
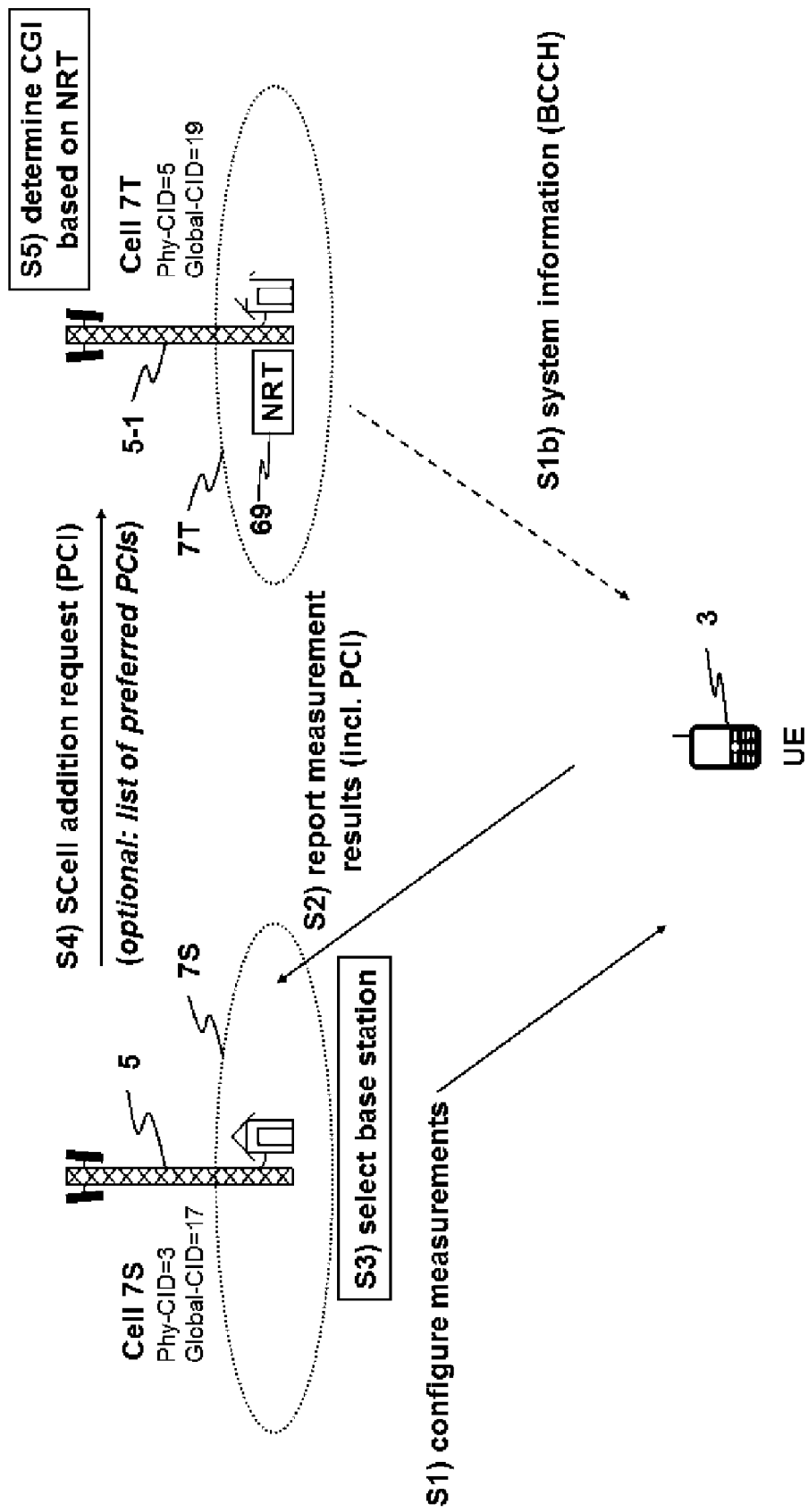
FIG. 5d is a schematic diagram illustrating another exemplary way in which PSC/PCI confusion may be addressed in the system shown in FIG. 1.

This option is generally illustrated in FIG. 5d. In this example, the other base station 5-1 (e.g. gNB) is configured to determine the GCI of the correct target cell 7T, based on its NRT 69, rather than the serving base station 5 that configured to signal measurements for the mobile device 3. This option may be particularly beneficial when setting up a secondary cell for dual connectivity. If the UE's current cell 7S (PCell) is an LTE/E-UTRAN cell and the selected cell 7T (SCell) is an NR cell, then the dual connectivity is referred to as an EN-DC scenario. If both cells 7S and 7T are NR cells then the dual connectivity is referred to as an NGEN-DC scenario.

In more detail, the mobile device 3 may be configured to report the global cell identity for at least a predetermined subset (a predetermined number) of cells 7 in its measurement report to the base station 5. This step is similar to the previous options (e.g. steps S1 to S2 of FIG. 5a or FIG. 5b).

However, in this example, when the serving base station 5 (e.g. an eNB controlling the UE's current cell 7S) selects a cell 7T, for which no GCI has been reported, as a candidate secondary cell for dual connectivity for the mobile device 3, the serving base station 5 checks whether there is a PCI confusion relating to the PCI for that cell 7T. If there is no PCI confusion then the base station 5 proceeds as per normal operation.

If there is a known PCI confusion for the selected cell 7T, then the base station 5 proceeds with the addition of a secondary cell towards that particular base station 5-1 that controls a cell 7 that the mobile device 3 reported to be the strongest. It will be appreciated that the cell 7 with the strongest signal is most likely to be one for which a GCI has been reported by the mobile device 3 and hence the base station 5-1 controlling that cell 7 can be determined based on the GCI.

Thus, the serving base station 5 generates and sends, in step S4, a request to that base station 5-1 to add a secondary cell. The request (e.g. 'SCell addition request') identifies the strongest cell 7 (e.g. by its GCI or PCI) and it also identifies the cell 7T by its PCI (e.g. as a preferred cell). The serving base station 5 may also include in its request information (e.g. one or more PCI) identifying one or more further preferred cells 7, if appropriate. In other words, the serving base station 5 may be configured to indicate the strongest cell and a preference of different candidate secondary cells 7 (e.g. in the form of a list of cells/PCIs from most preferred to least preferred).

The other base station 5-1 may be able to add the strongest cell 7 as a secondary cell for the mobile device 3 and reserve appropriate resources for communicating with the mobile device 3 via that cell 7. Alternatively, in accordance with the indicated preference of the serving base station 5, and if there is no PCI confusion, the other base station 5-1 may be able to add the cell 7T (with PCI value 'X' in FIG. 6) as a secondary cell for the mobile device 3 and reserve appropriate resources for communicating with the mobile device 3 via that cell 7T.

Figure 6:
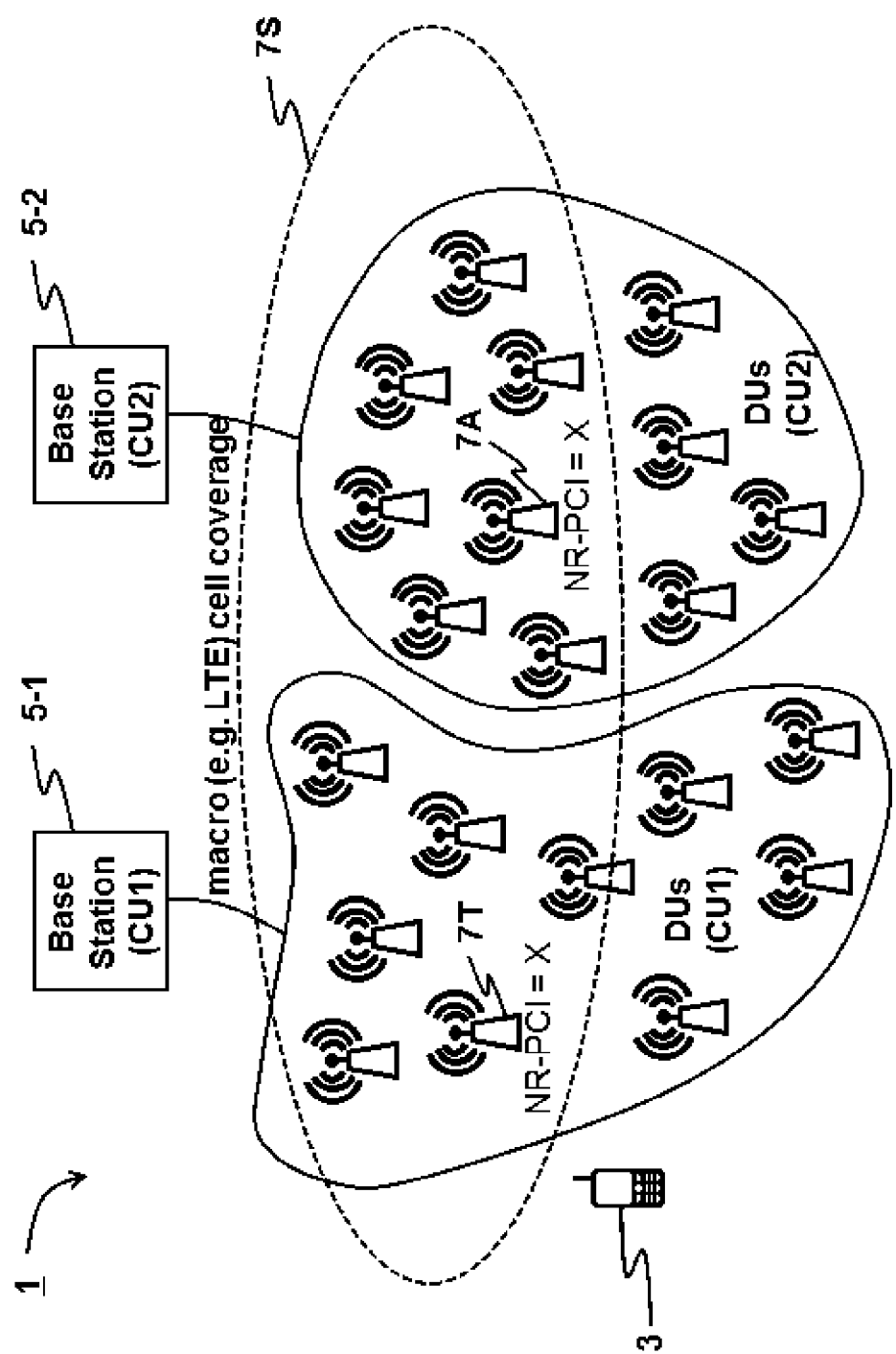
FIG. 6 illustrates schematically a possible scenario in which PSC/PCI confusion may arise in the system of FIG. 1.
Figure 7:
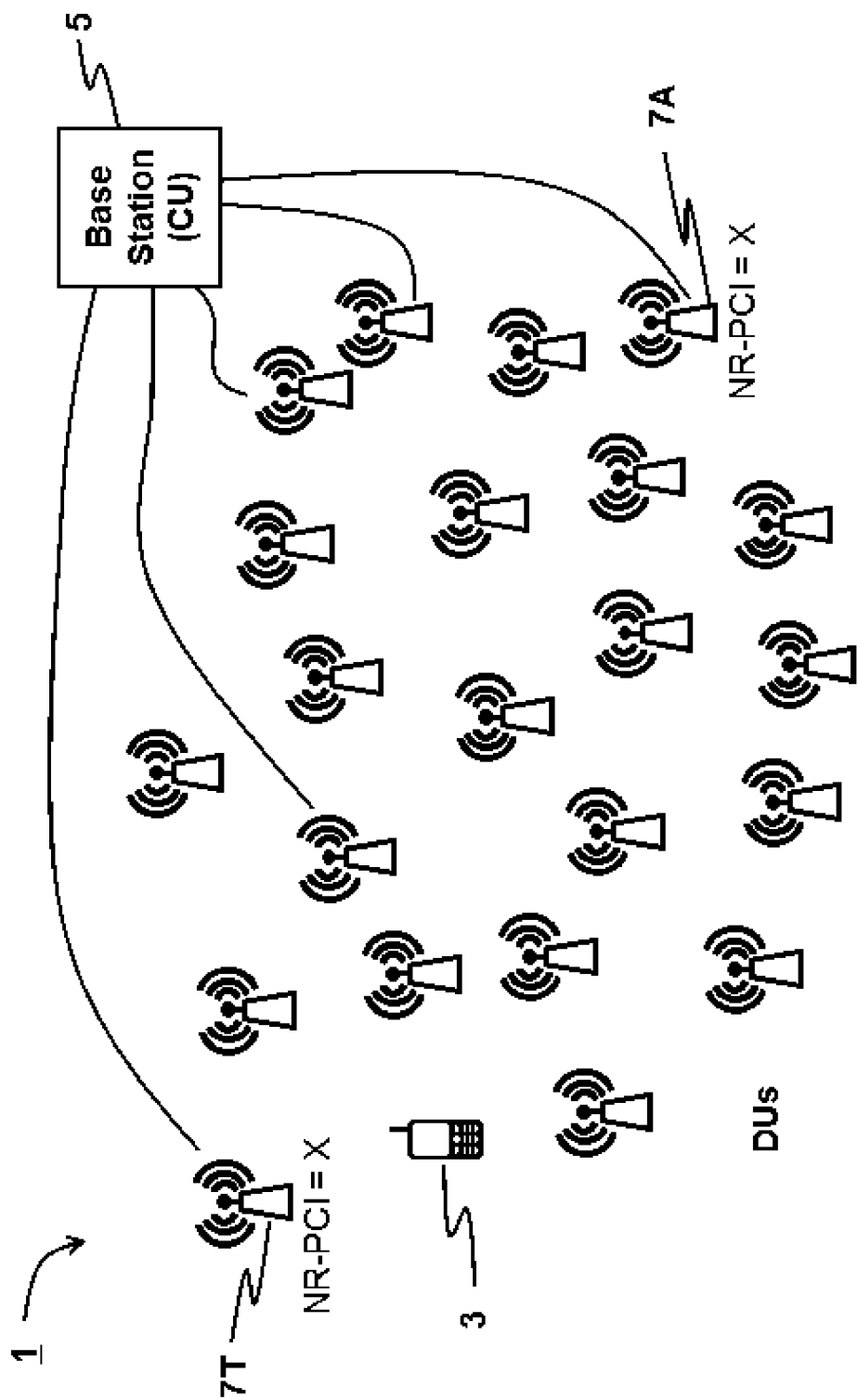
FIG. 7 illustrates schematically a possible scenario in which PSC/PCI confusion may arise in the system of FIG. 1.

However, there might be a PCI confusion with respect to the preferred cell 7T, for example, as shown in FIG. 6 where cell 7A controlled by base station 5-2 has the same PCI value 'X', or as shown in FIG. 7 where two cells 7A and 7T controlled by the same base station 5 have the same PCI value 'X'.

Beneficially, even if there is a PCI confusion affecting the preferred cell 7T, the base station 5-1 may be able to determine the GCI for the correct cell (e.g. cell 7A or cell 7T) based on the NRT 69 (e.g. as illustrated in Table 1).

Specifically, in this example, the base station 5-1 is configured to check the NRT 69 for the strongest cell 7 (preferably a small/NR cell having a relatively few neighbours) for which a GCI has been reported by the mobile device 3. The base station 5-1 can assume that the preferred cell 7T is likely to have a similar good reported signal strength and/or signal quality to that of the strongest cell 7, and hence the preferred cell 7T is most likely a neighbour of the strongest cell 7 for which a GCI has been reported (which is indicated by the NRT 69 for the strongest cell 7).

If the base station 5-1 determines, in step S5, that the requested PCI belongs to cell 7A, it may be configured to forward the received SCell addition request to the correct base station 5-2 (based on the GCI of that cell 7A, if known). Alternatively, the base station 5-1 may be configured to notify the requesting base station 5 about the GCI of the correct cell 7A, or it may return an error (e.g. 'SCell addition failure' and/or the like) including an appropriate failure reason.

If the base station 5-1 determines, in step S5, that the requested PCI belongs to its own cell 7T, it may proceed to adding that cell 7T as a secondary cell for the mobile device 3 and reserving resources for communicating with the mobile device 3 via that cell 7T. The base station 5-1 may also be configured to notify the requesting (primary) base station 5 that the addition of the preferred cell 7T as secondary cell was successful.

Moreover, if a preference of different candidate secondary cells 7 was included in the message received at step S4, the base station 5-1 may be configured to select a different cell 7 from the one or more further cells 7 listed in the cell addition request (for example, if there are insufficient resources in the requested cell 7T or the strongest cell 7).

Option 3

Figure 5E:
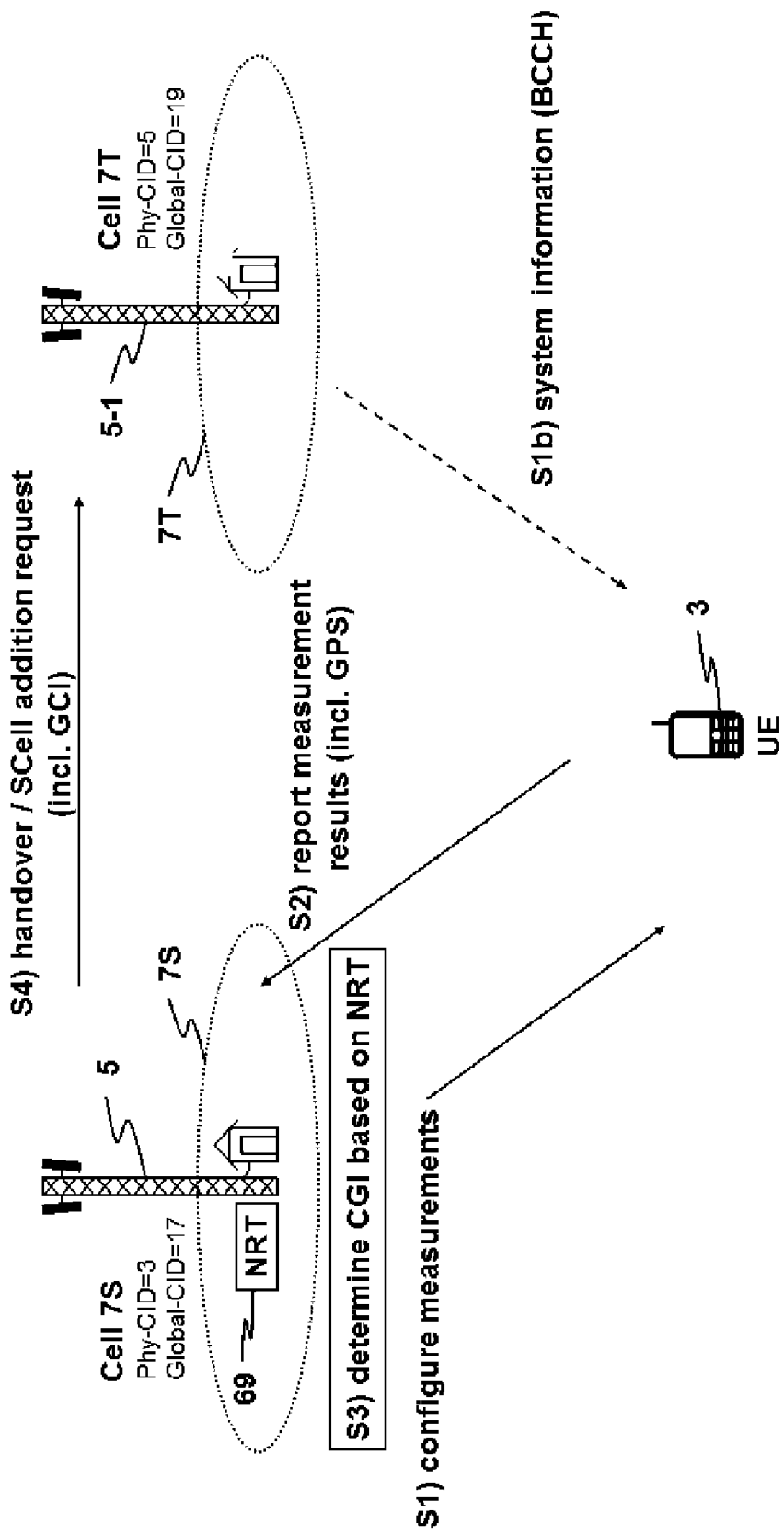
FIG. 5e is a schematic diagram illustrating another exemplary way in which PSC/PCI confusion may be addressed in the system shown in FIG. 1.

This option is illustrated in FIG. 5e. In this example, the mobile device 3 is configured to include information identifying its geographical location (e.g. latitude/longitude obtained by its GNSS module 47) in the measurement results for at least a subset of cells 7 being reported (in step S2). Accordingly, it may not be necessary for the mobile device 3 to obtain and report an associated GCI for the reported cells 7 (step S1b is optional).

Table 2 illustrates some of the fields that may be included in an exemplary Neighbour Relation Table 69 of the serving base station 5 in accordance with this option. It will be appreciated that a similar NRT 69 may be stored in the memory 59 for each cell 7 controlled by the base station 5. As can be seen, for each neighbour cell 7, the NRT 69 includes (amongst others) information identifying a geographical location of that cell 7.

TABLE 2 exemplary NRT (including GPS location)

| Cell | GCI | frequency | PCI | GPS | ... |
|------|-----|-----------|-----|-----|-----|
| #1   | xxx | m         | x   | xxx | ... |
| #2   | xxx | m         | y   | xxx |     |
| #3   | xxx | m         | z   | xxx |     |
| #4   | xxx | m         | w   | xxx |     |
| #5   | xxx | n         | x   | xxx |     |
| #6   | xxx | n         | y   | xxx |     |
| ...  |     |           |     |     |     |

Beneficially, in case of a PCI confusion, the serving base station 5 may be configured to determine, in step S3, the GCI of the correct cell 7T based on the information identifying the mobile device's location and the information (in the NRT 69) identifying the location of each cell having the same PCI as the reported one. For example, the base station 5 may be configured to determine which cell 7 is closest to the location of the mobile device 3 (although the base station 5 may take into account other information such as an associated power level of each cell in order to fine tune its determination).

<Modifications and Alternatives>

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above example embodiments, the base station uses a 3GPP radio communications (radio access) technology to communicate with the mobile device. However, any the base station and the mobile device may be configured to communicate with each other using any other suitable radio communications technology (i.e. WLAN, Wi-Fi, WiMAX, Bluetooth, etc.). The above example embodiments are also applicable to 'non-mobile' or generally stationary user equipment.

In the examples shown in FIGS. 1, 6, and 7, for illustration purposes, each DU is associated with a single cell. However, when implemented, each DU may be associated with a plurality of cells.

In the above example embodiments where the mobile device is described to report the global cell identity for a predetermined number of cells (or a subset of all measured cells) to the base station, the associated global cell identity is reported for those cells that have the strongest signal and/or that are likely to have a PCI confusion issue. It will be appreciated, however, that the mobile device may be configured to report (e.g. include in a measurement report) the global cell identity for a predetermined set/type of cells including one or more of: NR cells; home base station cells (small cells); CSG cells; non-CSG cells; and cells having an associated PCI falling within a predetermined range.

It will be appreciated that the geographical location of the mobile device (option 3) may be included in the initial measurement report (as shown in FIG. 5e). Alternatively, the geographical location of the mobile device may be provided upon request by the serving base station, similarly to steps S2 and S3 of FIG. 5c. In this case, step S2 may be modified to request the geographical location of the mobile device and step S3 may be modified to report the GPS coordinates of the mobile device (e.g. instead of or in addition to the GCI of the reported cell).

For all options, it will be appreciated that reporting of the GCI/GPS by the mobile device may be switched on/off by the base station via appropriately formatted measurement configuration signalling. For example, reporting of GCI/GPS may be turned off if PCI confusion is unlikely to happen, e.g. in case of a relatively sparse NR cell deployment. The base station may in this case be configured to determine, based on its NR neighbour list (in its NRT), how many neighbour NR cells share the same PCI (if any). If for example the base station determines that no NR cell or a relatively small number of NR cells (e.g. below a predetermined threshold) share the same PCI, then the base station may turn off GCI/GPS reporting for the mobile device (or alternatively the base station may be configured to not turn on any GCI/GPS reporting, if it is turned off by default).

The above example embodiments address one or more possible PCI confusion scenarios. However, it will be appreciated that the above example embodiments may also be used to address similar PSC confusion scenarios (for example scenarios involving Closed Subscriber Group (CSG) cells which are normally identified by their associated PSC).

In the above description, the mobile device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the mobile device or the base station as a signal over a computer network, or on a recording medium. Further, the functionality performed by part or all of this software may be performed using one or more dedicated hardware circuits. However, the use of software modules is preferred as it facilitates the updating of the mobile device or the base station in order to update their functionalities.

The measurement report may further include a PCI of the at least one neighbour cell to which the at least one measurement result relates together with the corresponding at least one measurement and any corresponding GCI.

The measurement report may include measurement results for a plurality of neighbour cells, and wherein a GCI is included in the measurement report for all of the neighbour cells to which the measurement results in the measurement report relates.

The measurement report may include measurement results for a plurality of neighbour cells, wherein a GCI may be included in the measurement report for a subset of the plurality of neighbour cells to which the measurement results in the measurement report relates, but not for a further subset of the plurality of neighbour cells to which the measurement results in the measurement report relates.

The subset of the plurality of neighbour cells for which a GCI is included in the measurement report may include at least one cell for which a measured signal strength or quality is greater than for the neighbour cells in the further subset of the plurality of neighbour cells.

The subset of the plurality of neighbour cells for which a GCI is included in the measurement report may include at least one of: a predetermined neighbour cell; a predetermined type of cell (e.g. NR cell/home base station cell); and a cell having a PCI value from a predetermined range of PCI values.

The method may further include sending a request for obtaining a GCI for a cell of said further subset from system information broadcast for that cell.

The method may include attempting GCI resolution based on a Neighbour Relation Table (NRT), before sending said request, and only sending said request when GCI resolution not successful based on the NRT.

The NRT may be maintained by the base station apparatus.

The received measurement report may include at least one globally unique cell identifier (GCI) for at least one neighbour cell, and said identifying identifies said identified neighbour cell further based on the at least one GCI for another neighbour cell.

The received measurement report may include the at least one GCI for a subset of neighbour cells including at least one of: a predetermined neighbour cell; a predetermined type of cell (e.g. NR cell/home base station cell); and a cell having a PCI value from a predetermined range of PCI values.

The method may include identifying the neighbour based on the received PCI and information, held in the NRT, relating to a neighbour cell for which an associated signal strength or quality is reported to be the greatest (and for which a GCI has been reported by the UE).

The communication procedure involving the UE and the identified neighbour cell may include a handover to the identified neighbour cell or an addition of the identified neighbour cell as a secondary cell (SCell).

The base station apparatus may include an LTE base station and the at least one neighbour cell may be an NR cell.

The method may include configuring E-UTRAN New Radio-Dual Connectivity (EN-DC) for the UE involving the identified neighbour cell.

The method may further include: determining, based on the NRT, when it is determined that the received message does not relate to a cell controlled by the base station apparatus, a different cell having the same PCI and a base station apparatus that controls that different cell; and forwarding the received message to the base station apparatus that controls that different cell.

The received message may include a plurality of PAs respectively associated with a plurality of cells; and the method may further include: selecting, based on the received plurality of PCIs, a cell controlled by the base station apparatus; and proceeding with the communication procedure using the selected cell.

Various other modifications will be apparent to those skilled in the art and will not be described in further detail here.

<Automatic Neighbour Relation>

Manually provisioning and managing neighbour cells in traditional mobile network is a challenging task and it becomes more difficult as new mobile technologies are being rolled out while 'legacy' 2G/3G/4G cells already exist. As described in 3GPP TS 36.300 section 22.3.2a, the purpose of the Automatic Neighbour Relation (ANR) function is to relieve the operator from the burden of manually managing neighbour relations.

For each cell, the base station keeps a conceptual Neighbour Relation Table (NRT). The ANR function resides in the base station (e.g. DU) and includes appropriate functionality for managing the NRT (per cell). The so-called Neighbour Detection Function is responsible for finding new neighbours and adding them to the NRT. This is normally performed by the base station configuring appropriate cell measurements for one or more mobile devices served by the base station, and receiving corresponding measurement reports from the mobile devices including information identifying the measured cells. When the measurement reports identify a cell which is not listed in the NRT (for the given cell), the Neighbour Detection Function adds this cell to the NRT (after appropriate communication with other nodes, if necessary).

The so-called Neighbour Removal Function is responsible for removing outdated neighbour relations (NRs). The Neighbour Detection Function and the Neighbour Removal Function are implementation specific, and may thus differ from base station to base station.

In addition, the neighbour information exchange between two base stations (e.g. during the X2/Xn Setup procedure or the eNB/gNB Configuration Update procedure) may also be used for ANR purposes. The ANR function also allows the network operator to manage the NRT via an operation and maintenance (O&M) function. The operator can use the O&M function for manually adding, deleting NRs, and/or changing the attributes of the NRT, if appropriate. The ANR function may also inform the O&M system about changes in the NRT (e.g. about changes that are not made via the O&M function).

In order for the mobile devices to uniquely identify the source of a received signal, each base station is given a signature sequence referred to as a Physical Cell ID (PCI) or a 'physical-layer cell identity'. The PCI is defined by: the carrier frequency and the Primary Scrambling Code (PSC) in case of UTRAN Frequency Division Duplex (FDD) cell; the carrier frequency and the cell parameter ID in case of UTRAN Time Division Duplex (TDD) cell; the Band Indicator+Base Station Identity Code (BSIC)+Broadcast Control Channel (BCCH) Absolute Radio Frequency Channel Number (ARFCN) in case of a GSM EDGE Radio Access Network (GERAN) cell; and the pseudorandom noise (PN) offset in case of CDMA2000 cell.

For each neighbour relation, the NRT usually includes an associated Target Cell Identifier (TCI), which identifies that cell as a target cell (e.g. for handover or other signalling). In some of the examples described above the NRT also includes an associated geographical location for each neighbour cell (e.g. GPS coordinates and/or the like). In current E-UTRAN systems, the TCI corresponds to the E-UTRAN Cell Global Identifier (ECGI) and the PCI. Therefore, in conventional ANR implementations, a neighbour relation from a source cell to a target cell means that the base station controlling the source cell: a) knows the ECGI/CI and the PCI of the target cell; b) has an entry in the NRT for the source cell identifying the target cell; and c) the attributes in this Neighbour Relation Table entry have been defined (for example, by O&M or set to default values).

The invention claimed is:

1. A method performed by a base station, the method comprising:
   operating a cell in accordance with a first Radio Access Technology (RAT);
   receiving, from a user equipment (UE), a measurement report including at least one physical cell identifier corresponding to a plurality of neighbor cells which are in accordance with a second RAT; and
   transmitting a cell global identifier of the cell, to a neighboring base station, in a procedure of dual connectivity between the base station and the neighboring base station.

2. The method according to claim 1, further comprising:
attempting resolution of a unique cell identifier based on a Neighbor Relation Table (NRT), in a case where a measurement related to the measurement report is for a predetermined objective.

3. The method according to claim 2, wherein
the predetermined objective is Evolved Universal Terrestrial Radio Access New Radio-Dual Connectivity (EN-DC).

4. The method according to claim 1, further comprising:
providing neighbor cell relationship to the neighboring base station.

5. The method according to claim 1, further comprising:
transmitting, based on the at least one physical cell identifier, a request for at least one cell global identifier, to the UE; and
receiving, from the UE, the at least one cell global identifier, each of the at least one cell global identifier including a respective Public Land Mobile Network (PLMN) identifier.

6. A method performed by a user equipment (UE), the method comprising:
transmitting, to a base station configured to operate a cell in accordance with a first Radio Access Technology (RAT), a measurement report including at least one physical cell identifier corresponding to a plurality of neighbor cells which are in accordance with a second RAT for use by the base station in identifying a neighbor cell, from among the plurality of neighbor cells,
wherein a cell global identifier of the cell is transmitted from the base station to a neighboring base station, in a procedure of dual connectivity between the base station and the neighboring base station operating the neighbor cell.

7. The method according to claim 6, wherein neighbor cell relationship is provided from the base station to the neighboring base station.

8. The method according to claim 6, further comprising:
receiving, based on the at least one physical cell identifier, a request for at least one cell global identifier, from the base station; and
transmitting, to the base station, the at least one cell global identifier, each of the at least one cell global identifier including a respective Public Land Mobile Network (PLMN) identifier.

9. A base station, comprising:
a memory storing instructions; and
at least one processor configured to process the instructions to:
operate a cell in accordance with a first Radio Access Technology (RAT);
receive, from a user equipment (UE), a measurement report including at least one physical cell identifier corresponding to a plurality of neighbor cells which are in accordance with a second RAT; and
transmit a cell global identifier of the cell, to a neighboring base station, in a procedure of dual connectivity between the base station and the neighboring base station.

10. A user equipment (UE), comprising:
a memory storing instructions; and
at least one processor configured to process the instructions to:
transmit, to a base station configured to operate a cell in accordance with a first Radio Access Technology (RAT), a measurement report including at least one physical cell identifier corresponding to a plurality of neighbor cells which are in accordance with a second RAT for use by the base station in identifying a neighbor cell, from among the plurality of neighbor cells,
wherein a cell global identifier of the cell is transmitted from the base station to a neighboring base station, in a procedure of dual connectivity between the base station and the neighboring base station operating the neighbor cell.

* * * * *